US011664931B2

(12) United States Patent
Han et al.

(10) Patent No.: US 11,664,931 B2
(45) Date of Patent: May 30, 2023

(54) DUPLICATION TRANSMISSION METHOD AND APPARATUS

(71) Applicant: Huawei Technologies Co., Ltd., Shenzhen (CN)

(72) Inventors: Feng Han, Shanghai (CN); Yinghao Jin, Shanghai (CN); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/657,247

(22) Filed: Oct. 18, 2019

(65) Prior Publication Data

US 2020/0052826 A1 Feb. 13, 2020

Related U.S. Application Data

(63) Continuation of application No. PCT/CN2018/083760, filed on Apr. 19, 2018.

(30) Foreign Application Priority Data

Apr. 19, 2017 (CN) .......................... 201710257589.7

(51) Int. Cl.
*H04W 72/04* (2023.01)
*H04L 1/1607* (2023.01)
*H04L 1/1829* (2023.01)
*H04L 5/00* (2006.01)

(52) U.S. Cl.
CPC .......... *H04L 1/1671* (2013.01); *H04L 1/1861* (2013.01); *H04L 5/0053* (2013.01)

(58) Field of Classification Search
None
See application file for complete search history.

(56) References Cited

U.S. PATENT DOCUMENTS 9,763,282 B2 * 9/2017 Pelletier ............ H04W 72/1268
10,361,823 B2 * 7/2019 Xu ........................ H04L 1/1896
10,716,122 B2 * 7/2020 Holakouei ............ H04L 1/1835
(Continued)

FOREIGN PATENT DOCUMENTS

CN 104811409 A 7/2015
CN 106105334 A 11/2016
(Continued)

OTHER PUBLICATIONS

Huawei et al., "Activating and deactivating packet duplication," 3GPP TSG-RAN2 #97BIS, R2-1703529, Spokane, WA, USA, Apr. 3-7, 2017, 4 pages.
(Continued)

*Primary Examiner* — Sithu Ko
(74) *Attorney, Agent, or Firm* — Slater Matsil, LLP

(57) ABSTRACT

Embodiments provide a duplication transmission method and apparatus. The method includes: receiving, by a terminal device, duplication transmission configuration information sent by a radio access network RAN device, where the duplication transmission configuration information includes configurations of at least one of a duplication transmission mode or duplication transmission content of the terminal device; and performing, by the terminal device, duplication transmission based on the duplication transmission configuration information.

20 Claims, 6 Drawing Sheets

(56) References Cited

U.S. PATENT DOCUMENTS

| | | | |
|---|---|---|---|
| 11,088,941 B2* | 8/2021 | Tang | H04W 28/0236 |
| 11,121,831 B2* | 9/2021 | Kilinc | H04L 5/0098 |
| 2007/0116063 A1 | 5/2007 | Hardy et al. | |
| 2012/0057560 A1 | 3/2012 | Park et al. | |
| 2015/0271818 A1 | 9/2015 | Tavildar et al. | |
| 2017/0012755 A1 | 1/2017 | Wang et al. | |
| 2018/0102880 A1 | 4/2018 | Xu | |
| 2018/0279168 A1* | 9/2018 | Jheng | H04W 28/04 |
| 2018/0279262 A1* | 9/2018 | Babaei | H04W 72/04 |
| 2019/0327641 A1* | 10/2019 | Mok | H04W 4/40 |
| 2020/0092746 A1* | 3/2020 | Baek | H04W 80/08 |
| 2021/0112610 A1* | 4/2021 | Xiao | H04W 28/04 |

FOREIGN PATENT DOCUMENTS

| | | |
|---|---|---|
| EP | 3589009 A1 | 1/2020 |
| WO | 2016183705 A1 | 11/2016 |

OTHER PUBLICATIONS

Intel Corporation, "Packet duplication for URLLC in DC and CA deployment," 3GPP TSG-RAN WG2 NR Ad-hoc, R2-1700336, Spokane, WA, USA, Jan. 17-19, 2017, 3 pages.

CATT, "PDCP Duplication," 3GPP TSG-RAN WG2, Meeting #97bis, R2-1703114, Spokane, WA, USA, Apr. 3-7, 2017, 3 pages.

LG Electronics Inc., "Packet duplication in NR", 3GPP TSG-RAN WG2 NR Ad Hoc, R2-1700423, Jan. 17-19, 2017, 3 pages, Spokane, USA.

* cited by examiner

DUPLICATION TRANSMISSION METHOD AND APPARATUS

CROSS-REFERENCE TO RELATED APPLICATIONS

This application is a continuation of International Application No. PCT/CN2018/083760, filed on Apr. 19, 2018, which claims priority to Chinese Patent Application No. 201710257589.7, filed on Apr. 19, 2017. The disclosures of the aforementioned applications are hereby incorporated by reference in their entireties.

TECHNICAL FIELD

The embodiments of the present invention relates to the wireless communications field, and in particular, to a duplication transmission method and apparatus.

BACKGROUND

With rapid development of wireless communications technologies, a fifth-generation (5G) wireless communications technology has become a hotspot of the industry currently. 5G will support diversified application requirements, including higher-rate experience and a greater bandwidth access capability, information exchange with a lower latency and higher reliability, and access and management of a machine type communications device with a larger-scale and lower-costs, and the like. In addition, the 5G will support application scenarios of various vertical industries oriented to Internet of Vehicles, emergence communication, industrial Internet, and the like.

Ultra-reliable and low latency communications (URLLC) is an important communication type in the 5G. The URLLC is a communication service that requires much on latency and reliability, and is applied to scenarios such as unmanned driving and telemedicine. For this type of service, a requirement on a user plane latency needs to reach 0.5 ms in uplink/downlink transmission; and for transmission having a length of 32 bytes, when the user plane latency is 1 ms, reliability needs to reach $1-10^{-5}$ and the like. To support the URLLC service, air interface technologies of an existing mobile communications system need to be further optimized. For example, at a physical layer, a more robust modulation/coding technology and scheduling at a shorter transmission time interval may be used. As to how to effectively support transmission of data of the URLLC service at upper layers (for example, a media access control layer, a radio link control layer, and a packet data convergence protocol layer), there is no appropriate solution currently.

SUMMARY

Embodiments of this application provide a duplication transmission method, to improve robustness of data transmission of a terminal device.

According to a first aspect, an embodiment of this application provides a duplication transmission method, including: receiving, by a terminal device, duplication transmission configuration information sent by a radio access network (RAN) device, where the duplication transmission configuration information includes configurations of a duplication transmission mode and/or duplication transmission content of the terminal device; and performing, by the terminal device, duplication transmission based on the duplication transmission configuration information. Therefore, according to the duplication transmission method in this embodiment of this application, the terminal device performs duplication transmission based on the duplication transmission configuration information sent by the RAN device, thereby improving robustness of data transmission of the terminal device.

In a possible implementation, the terminal device receives the duplication transmission configuration information sent by the RAN device, by using at least one of the following configuration signaling: radio resource control configuration signaling, packet data convergence protocol configuration signaling, or media access control configuration signaling. According to the duplication transmission method using a plurality of types of signaling, in this embodiment of this application, duplication transmission is flexibly configured, and duplication transmission of data of different protocol layers can be implemented.

In a possible implementation, the configuration of the duplication transmission mode of the terminal device is used to instruct the terminal device whether to perform duplication transmission, or instruct the terminal device to perform duplication transmission on at least two links. Therefore, in this embodiment of this application, duplication transmission is configured in a plurality of manners.

In a possible implementation, the configuration of the duplication transmission content of the terminal device is used to indicate data radio bearer data and/or signaling data on which the terminal device performs duplication transmission. Therefore, in this embodiment of this application, duplication transmission of a plurality of types of data is configured.

In a possible implementation, the instructing the terminal device to perform duplication transmission on at least two links further includes: instructing the terminal device to perform duplication transmission on a specified quantity of at least two links; or instructing the terminal device to perform duplication transmission on at least two specified links.

In a possible implementation, the at least two links correspond to: at least two logical channels, at least two cells, at least two carriers, at least two types of numerologies, or at least two antenna ports, and the terminal device communicates with the RAN device in at least one of the manners. Therefore, in this embodiment of this application, duplication transmission to be performed by the terminal device in a plurality of communication scenarios is configured.

In a possible implementation, the signaling data includes at least one of the following data: radio resource control signaling data, a packet data convergence protocol layer control message, or a media access control layer control message. Therefore, in this embodiment of this application, duplication transmission of a plurality of types of signaling data is configured.

In a possible implementation, the packet data convergence protocol configuration signaling includes a protocol data unit type and a duplication transmission instruction; the protocol data unit type is used to indicate that the packet data convergence protocol configuration signaling is used to configure duplication transmission to be performed by the terminal device; and the duplication transmission instruction is used to instruct whether to perform duplication transmission on data radio bearer data or signaling radio bearer data of a packet data convergence protocol layer corresponding to the packet data convergence protocol configuration signaling. Therefore, in this embodiment of this application, duplication transmission of the data radio bearer data or the signaling radio bearer data of the packet data convergence protocol layer is configured by using the packet data convergence protocol configuration signaling.

In a possible implementation, the media access control configuration signaling includes a media access control layer control element; the media access control layer control element includes a media access control subheader, a logical channel identity or a logical channel group identity, and a duplication transmission instruction; the media access control subheader is used to indicate that the media access control layer control element is used to configure duplication transmission to be performed by the terminal device; and the duplication transmission instruction is used to instruct whether to perform duplication transmission on logical channel data or logical channel group data corresponding to the logical channel identity or the logical channel group identity. Therefore, in this embodiment of this application, duplication transmission of the logical channel data or the logical channel group data of a media access control layer is configured by using the media access control configuration signaling.

According to a second aspect, an embodiment of this application provides a duplication transmission method, including: sending, by a radio access network (RAN) device, duplication transmission configuration information to the terminal device, where the duplication transmission configuration information includes configurations of a duplication transmission mode and/or duplication transmission content of the terminal device; and receiving, by the RAN device, duplication transmission content of the terminal device. Therefore, according to the duplication transmission method in this embodiment of this application, the RAN device configures the terminal device to perform duplication transmission, thereby improving robustness of data transmission of the terminal device.

In a possible implementation, the RAN device sends the duplication transmission configuration information to the terminal device by using at least one of the following configuration signaling: radio resource control configuration signaling, packet data convergence protocol configuration signaling, or media access control layer configuration signaling. According to the duplication transmission method using a plurality of types of signaling, in this embodiment of this application, duplication transmission is flexibly configured, and duplication transmission of data of different protocol layers can be implemented.

In a possible implementation, the configuration of the duplication transmission mode of the terminal device is used to instruct the terminal device whether to perform duplication transmission, or instruct the terminal device to perform duplication transmission on at least two links. Therefore, in this embodiment of this application, duplication transmission is configured in a plurality of manners.

In a possible implementation, the configuration of the duplication transmission content of the terminal device is used to indicate data radio bearer data and/or signaling data on which the terminal device performs duplication transmission. Therefore, in this embodiment of this application, duplication transmission of a plurality of types of data is configured.

In a possible implementation, the instructing the terminal device to perform duplication transmission on at least two links further includes: instructing the terminal device to perform duplication transmission on a specified quantity of at least two links; or instructing the terminal device to perform duplication transmission on at least two specified links.

In a possible implementation, the at least two links correspond to: at least two logical channels, at least two cells, at least two carriers, at least two types of numerologies, or at least two antenna ports, and the terminal device communicates with the RAN device in at least one of the manners. Therefore, in this embodiment of this application, duplication transmission to be performed by the terminal device in a plurality of communication scenarios is configured.

In a possible implementation, the signaling data includes at least one of the following data: radio resource control signaling data, a packet data convergence protocol layer control message, or a media access control layer control message.

In a possible implementation, the packet data convergence protocol configuration signaling includes a protocol data unit type and a duplication transmission instruction; the protocol data unit type is used to indicate that the packet data convergence protocol configuration signaling is used to configure duplication transmission to be performed by the terminal device; and the duplication transmission instruction is used to instruct whether to perform duplication transmission on data radio bearer data or signaling radio bearer data of a packet data convergence protocol layer corresponding to the packet data convergence protocol configuration signaling. Therefore, in this embodiment of this application, duplication transmission of the data radio bearer data or the signaling radio bearer data of the packet data convergence protocol layer is configured by using the packet data convergence protocol configuration signaling.

In a possible implementation, the media access control configuration signaling includes a media access control layer control element; the media access control layer control element includes a media access control subheader, a logical channel identity or a logical channel group identity, and a duplication transmission instruction; the media access control subheader is used to indicate that the media access control layer control element is used to configure duplication transmission to be performed by the terminal device; and the duplication transmission instruction is used to instruct whether to perform duplication transmission on logical channel data or logical channel group data corresponding to the logical channel identity or the logical channel group identity. Therefore, in this embodiment of this application, duplication transmission of the logical channel data or the logical channel group data of a media access control layer is configured by using the media access control configuration signaling.

According to a third aspect, an embodiment of this application provides a duplication transmission method, including: receiving, by a terminal device, duplication transmission trigger information sent by a radio access network (RAN) device, where the duplication transmission trigger information is used to configure a trigger condition of performing, by the terminal device, duplication transmission; and performing, by the terminal device, duplication transmission based on the duplication transmission trigger information. Therefore, according to the duplication transmission method in this embodiment of this application, the terminal device receives the trigger condition of duplication transmission that is configured by the RAN device, thereby improving robustness of data transmission of the terminal device when the trigger condition is satisfied.

In a possible implementation, the duplication transmission trigger information includes a threshold, of at least one type of network metric of at least one link, triggering duplication transmission; the at least one link corresponds to: one cell, one carrier, one type of numerology, or one antenna port, and the terminal device communicates with the RAN device in at least one of the manners; and the network metric includes at least one of the following: reference signal received power, reference signal received quality, a packet loss rate, or a quantity of retransmission times of an automatic repeat request. A plurality of types of network metrics are used as the trigger condition of duplication transmission, so that in this embodiment of this application, duplication transmission to be performed by the terminal device in a plurality of cases is implemented.

In a possible implementation, the terminal device performs duplication transmission on data of the link when at least one trigger condition is satisfied, and the duplication transmission includes duplication transmission of data radio bearer data and/or signaling data of the terminal device. Therefore, in this embodiment of this application, duplication transmission of a plurality of types of data is triggered.

According to a fourth aspect, an embodiment of this application provides a duplication transmission method, including: sending, by a radio access network (RAN) device, duplication transmission trigger information to a terminal device, where the duplication transmission trigger information is used to configure a trigger condition of performing, by the terminal device, duplication transmission; and receiving, by the RAN device, duplication transmission that is sent by the terminal device based on the duplication transmission trigger information. Therefore, according to the duplication transmission method in this embodiment of this application, the RAN device configures the trigger condition of performing duplication transmission by the terminal device, thereby improving robustness of data transmission of the terminal device when the trigger condition is satisfied.

In a possible implementation, the duplication transmission trigger information includes a threshold, of at least one type of network metric of at least one link, triggering duplication transmission; the at least one link corresponds to: one cell, one carrier, one type of numerology, or one antenna port, and the terminal device communicates with the RAN device in at least one of the manners; and the network metric includes at least one of the following: reference signal received power, reference signal received quality, a packet loss rate, or a quantity of retransmission times of an automatic repeat request. A plurality of types of network metrics are used as the trigger condition of duplication transmission, so that in this embodiment of this application, duplication transmission to be performed by the terminal device in a plurality of cases is implemented.

In a possible implementation, the RAN device receives duplication transmission sent by the terminal device when the terminal device satisfies at least one trigger condition, and the duplication transmission includes duplication transmission of data radio bearer data and/or signaling data of the terminal device. Therefore, in this embodiment of this application, duplication transmission of a plurality of types of data is triggered.

According to a fifth aspect, a communications apparatus is provided. The apparatus is configured to perform the method according to any one of the first to the fourth aspects or the possible implementations of the first to the fourth aspects. Specifically, the communications apparatus may include units configured to perform the method according to any one of the first to the fourth aspects or the possible implementations of the first to the fourth aspects.

According to a sixth aspect, a communications apparatus is provided. The apparatus includes a memory and a processor. The memory is configured to store a computer program, and the processor is configured to invoke the computer program from the memory and run the computer program, so that the communications apparatus performs the method according to any one of the first to the fourth aspects or the possible implementations of the first to the fourth aspects.

According to a seventh aspect, a computer program product is provided. The computer program product includes: computer program code, and when the computer program code is run by a communications unit and a processing unit or a transceiver and a processor of a communications device (for example, a network device or a network management device), the communications device is enabled to perform the method according to any one of the first to the fourth aspects or the possible implementations of the first to the fourth aspects.

According to an eighth aspect, a computer readable storage medium is provided. The computer readable storage medium stores a program, and the program enables user equipment to perform the method according to any one of the first to the fourth aspects or the possible implementations of the first to the fourth aspects.

These and other aspects of the embodiments of the present invention will be more concise and easier to understand in descriptions of the following (plurality of) embodiments.

BRIEF DESCRIPTION OF THE DRAWINGS

The following briefly describes the accompanying drawings used in embodiments of this application.

DETAILED DESCRIPTION OF ILLUSTRATIVE EMBODIMENTS

Figure 1:
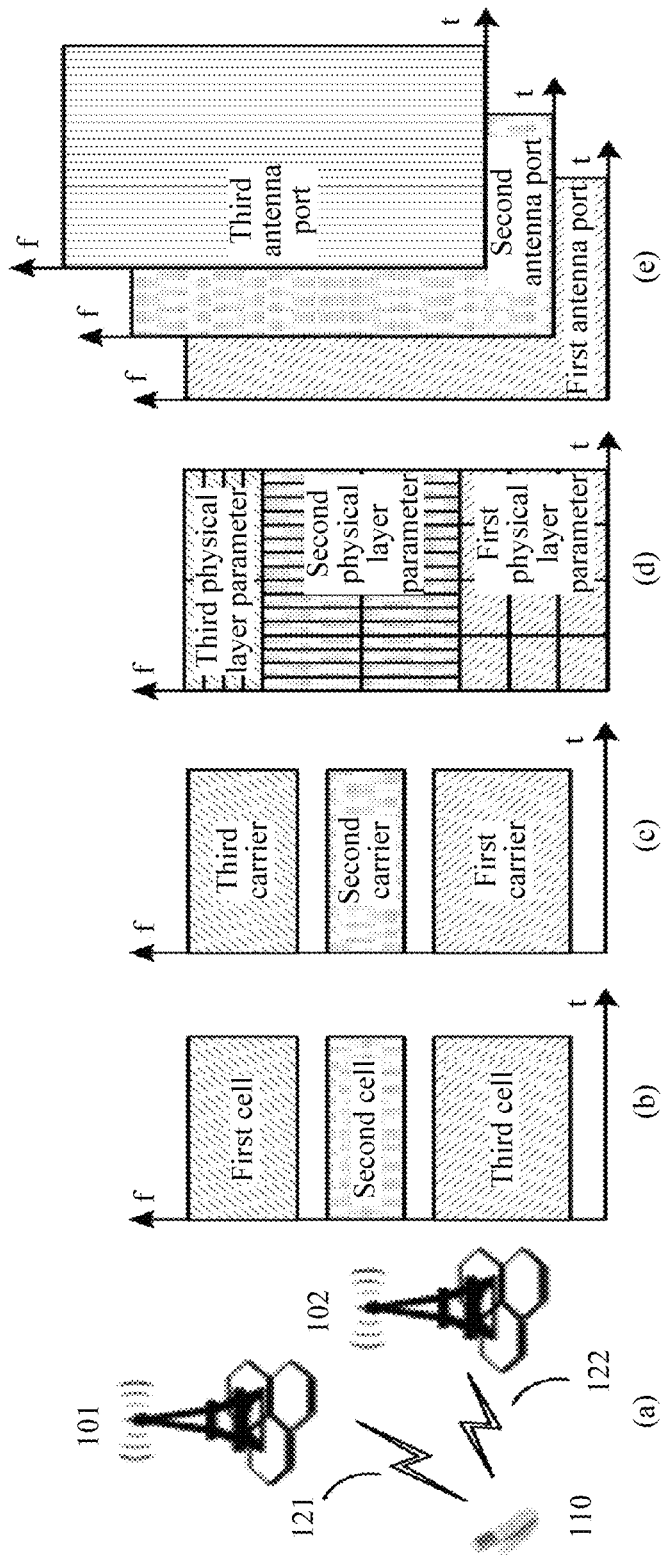
FIG. 1 shows a communication scenario according to an embodiment of this application.

The following describes the embodiments of this application with reference to the accompanying drawings in the embodiments of this application.

In this application, the word "exemplary" is used to represent "giving an example, an illustration, or a description". Any embodiment described as "exemplary" in this application should not be explained as having more advantages than another embodiment. For the purpose that any person skilled in the art can implement and use the embodiments of the present invention, the following description is provided. In the following description, details are listed for the purpose of explanation. It should be understood that, a person of ordinary skill in the art may learn that the embodiments of the present invention can also be implemented without using these specific details. In other instances, well-known structures and processes will not be described in detail, to avoid that unnecessary details make the description of the embodiments of the present invention obscure. Therefore, the present invention is not intended to limit the embodiments shown, but is consistent with the principle and features in the widest range disclosed in this application.

In the specification, claims, and accompanying drawings of the embodiments of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe the technical solutions of the present invention in detail. The following several specific embodiments may be combined with each other, and a same or similar concept or process may not be described repeatedly in some embodiments.

It should be understood that, the embodiments of the present invention may be applied to various communications systems, for example: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a universal mobile telecommunication system (UMTS) system, or a next-generation wireless communications system such as a new radio (NR) system and evolved LTE (eLTE).

As a typical application scenario of 5G, application such as unmanned driving and telemedicine requires a wireless network to provide a URLLC service with high reliability and a low latency. For this reason, the embodiments of the present invention provide a technical solution to performing duplication transmission on at least two links to transmit data of the URLLC service, to improve reliability of data transmission of the URLLC service and ensure a low latency. When a terminal device falls within a coverage range of a mobile network, the terminal device may establish a wireless connection with a base station to implement communication between the terminal device and the network. There may be at least two links between the terminal device and the base station. For example, the terminal device may communicate with the base station by using at least two carriers, at least two types of numerologies, or at least two antenna ports. Each carrier, each type of numerology, or each antenna port may be referred to as a link. Further, the terminal device may further establish a wireless connection with at least two base stations. For example, the terminal device establishes a connection with at least two base stations through a dual-connection/multi-connection technology, and in this case, a connection between the terminal device and each base station is referred to as a link, and there are at least two links for the terminal device to communicate with the network.

FIG. 1 shows a communication scenario according to the embodiments of the present invention. In FIG. 1(a), a terminal device 110 communicates with a RAN device 101 through a wireless connection 121. The RAN device may be an access point (AP) in a WLAN, a base transceiver station (BTS) in GSM or CDMA, a NodeB (NB) in WCDMA, an evolved NodeB (EeNB or eNodeB) in LTE, a relay station or an access point, an in-vehicle device, a wearable device, or a network device in a future 5G network or a network device in a future evolved PLMN network, which may be, for example, a base station (for example, Next-Generation Node B (gNB) or a Next-Generation Radio (NR)) in 5G, a transmission and reception point (TRP), a centralized unit (CU), and a distributed unit (DU). It should be understood that, in an actual network, the RAN device 101 may provide a service for a plurality of terminal devices. In addition, the terminal device 110 may alternatively establish a wireless connection with at least two RAN devices for communication. For example, the terminal device 110 may further communicate with the RAN device 102 through the wireless connection 122. FIG. 1(b) to FIG. 1(e) show time frequency resources used in communication in a dual-connection/multi-connection scenario, a carrier aggregation scenario, a multi-numerology scenario, and a multi-antenna scenario. An x-axis represents time and a y-axis represents frequency. In the embodiments of this application, the terminal device 110 communicates with at least one RAN device by using a transmission resource (for example, a frequency domain resource or a spectrum resource) that is used in a cell managed by at least one RAN device (for example, the RAN device 101 or the RAN device 102). The cell may be a cell corresponding to the RAN device (for example, the base station), and the cell may be a macro cell or a hyper cell, or may be a small cell. The small cell herein may be: a metro cell, a micro cell, a pico cell, a femto cell, and the like. These small cells are characterized by a small coverage range and low transmit power, and are suitable for providing a high-rate data transmission service.

The terminal device 110 may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device 110 may be a station (ST) in a wireless local area network (WLAN), and may be a cellular phone, a cordless phone, a session initiation protocol (SIP) phone, a wireless local loop (WLL) station, a personal digital assistant (PDA) device, a handheld device having a wireless communication function, a relay device, a computing device or another processing device connected to a wireless modem, an in-vehicle device, a wearable device, and a next-generation communications system, for example, a terminal device in a fifth-generation communications (5G) network or a terminal device in a future evolved public land mobile network (PLMN) network. By way of example and not limitation, in the embodiments of this application, the terminal device 110 may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smartwatches or smartglasses, and devices that focus on only one type of application and need to work with other devices such as smartphones, such as various smart bands or smart jewelry for monitoring physical signs.

In the dual-connection/multi-connection scenario shown in FIG. 1(b), at least two RAN devices (for example, a master RAN device 101 and a secondary RAN device 102) communicate with the terminal device 110 through three cells. In other words, there are three different links between the RAN device 101 and the RAN device 102 and the terminal device no. Each link may correspond to one cell, and the cell may be a cell in a master cell group (MCG) managed by the master RAN device 101, or may be a cell in a secondary cell group (SCG) managed by the secondary RAN device 102. In the dual-connection/multi-connection scenario, the terminal device establishes a connection with a plurality of cells managed by at least two RAN devices. In the at least two RAN devices, one RAN device is referred to as a master RAN device, and is responsible for transmission of control plane data and user plane data with the terminal device. A set of cells managed by the master RAN device is referred to as an MCG. In the at least two RAN devices, other RAN devices than the master RAN device are referred to as secondary RAN devices, and are mainly used for transmission of user plane data with the terminal device. A set of cells managed by the secondary RAN device is referred to as an SCG. For ease of description, in the following description in this specification, when the terminal device communicates with one or more RAN devices, the RAN device is used to describe the master RAN device with which the terminal device communicates. It should be understood that, at least two cells used by the RAN devices 101 and 102 to communicate with the terminal device no and a time frequency resource of each cell are determined by a network configuration or the master RAN device 101 through negotiation with the terminal device no. Time frequency resources of three cells shown in FIG. 1(b) are different, and in an actual network, the time frequency resources of the three cells may alternatively be the same. This depends on a system configuration.

In the multi-carrier scenario shown in FIG. 1(c), the RAN device 101 communicates with the terminal device 110 on a first carrier, a second carrier, and a third carrier. In other words, there are three different links between the RAN device 101 and the terminal device no, and each link corresponds to a carrier. In the multi-carrier scenario, the terminal device establishes a connection with at least two cells managed by one RAN device, and each cell correspondingly uses one carrier. In the at least two cells having different carriers, one cell is referred to as a primary cell (PCell), and is responsible for transmission of control plane data and user plane data with the terminal device. In the at least two cells, cells other than the primary cell are referred to as secondary cells (SCell), and are mainly used for transmission of user plane data with the terminal device. It should be understood that, in the multi-carrier scenario, a carrier and a cell have a same meaning and can be interchangeably used. A plurality of carriers/cells used by the RAN device 101 to communicate with the terminal device 110 and bandwidth of each carrier/cell are determined by a network configuration or the RAN device 101 through negotiation with the terminal device no.

In the multi-numerology scenario shown in FIG. 1(d), the RAN device 101 communicates with the terminal device 110 by using a first type of numerology, a second type of numerology, and a third type of numerology. In other words, there are three different links between the RAN device 101 and the terminal device no, and each link corresponds to one type of numerology. In the multi-numerology scenario, the terminal device 110 uses at least two types of numerologies to communicate with at least one cell managed by the RAN device 101. Typically, different numerologies have different subcarrier spacings and cyclic prefix (CP) lengths. In addition, different numerologies may further have different transmission time intervals (TTI). It should be understood that, at least two types of numerologies used by the RAN device 101 to communicate with the terminal device 110 and a resource configuration of each type of numerology are determined by a network configuration or the RAN device 101 through negotiation with the terminal device no.

In the multiple-input multiple-output (MIMO) scenario shown in FIG. 1(e), the RAN device 101 communicates with the terminal device 110 through a first antenna port, a second antenna port, and a third antenna port. In other words, there are three different links between the RAN device 101 and the terminal device no, and each link corresponds to an antenna port. Different antenna ports have different antenna port identities or sequence numbers. In the MIMO scenario, the terminal device 110 uses a plurality of antenna ports to communicate with at least one cell managed by the RAN device 101. It should be understood that, the plurality of antenna ports used by the RAN devices 101 to communicate with the terminal device 110 and a resource configuration of each antenna port are determined by a network configuration or the RAN device 101 through negotiation with the terminal device no.

Usually, for data transmission from the terminal device 110 to the RAN device 101 or the RAN devices 101 and 102, the following procedure will be experienced: A packet data convergence protocol (PDCP) layer of the terminal device 110 maps data from an application layer to a data radio bearer (DRB) to form DRB data, and transmits the DRB data to a radio link control (RLC) layer, or transmits signaling data from a control plane to the RLC layer. The RLC layer maps the DRB data or the signaling data to a logical channel (LC) and transmits the logic channel to a media access control (MAC) layer. The MAC layer implements multiplexing of data of one or more LCs and transmits the data to a physical layer by using a transport block of a particular size as a unit, thereby sending the data to the RAN device 101 or the RAN devices 101 and 102. For a service having a requirement for high reliability and a low latency, when there are at least two links between the terminal device 110 and the RAN device 101 or the RAN devices 101 and 102, the terminal device 110 performs duplication transmission on the data on the at least two links. The duplication transmission means that same data is transmitted on different links, which is usually referred to as data duplication or packet duplication, so that the RAN device 101 or the RAN devices 101 and 102 can receive, on the at least two links, the same data sent by the terminal device no. The RAN device 101 or the master RAN device 101 may further perform duplication detection on the received duplicated data on the PDCP layer to obtain required data. The following will describe the technical solution in the embodiments of the present invention by using transmission of a URLLC service as an example. It should be understood that, the technical solution in the embodiments of the present invention may also be used in transmission of other types of services such as a mobile broadband service, and a machine-to-machine communications service.

The following describes method embodiments of this application in detail with reference to FIG. 2 to FIG. 8. Specific embodiments are used below to describe the technical solutions of this application in detail. The following several specific embodiments may be combined with each other, and a same or similar concept or process may not be described repeatedly in some embodiments. It should be understood that, FIG. 2 to FIG. 8 are schematic flowcharts of a communication method in the embodiments of this application, and show detailed communication steps or operations of the method. However, these steps or operations are merely used as an example, and in the embodiments of this application, other operations or transformations of the various operations in FIG. 2 to FIG. 8 may alternatively be performed. In addition, the steps in FIG. 2 to FIG. 8 may be performed in a different sequence as presented in FIG. 2 to FIG. 8, and it may be possible that not all operations in FIG. 2 to FIG. 8 need to be performed.

Figure 2:
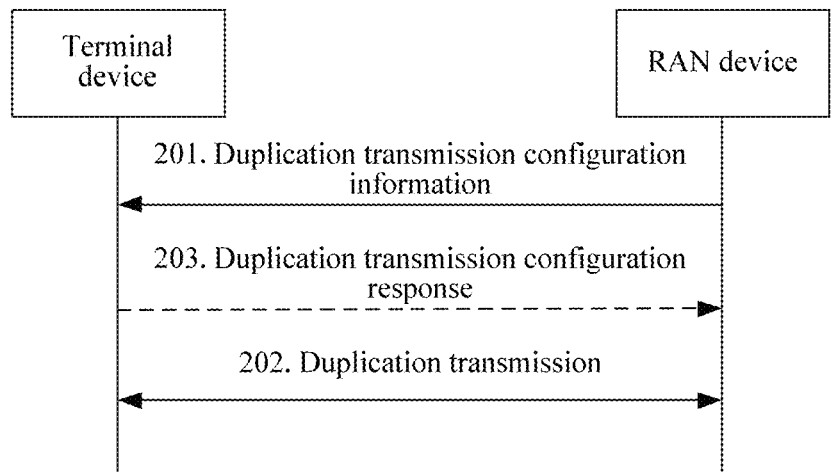
FIG. 2 is a schematic flowchart of a type of duplication transmission according to an embodiment of this application.

FIG. 2 is a schematic flowchart of a duplication transmission method 200 according to an embodiment of this application. The method 200 may be applied to the communication scenarios shown in FIG. 1 and includes the following steps.

201. A RAN device sends duplication transmission configuration information to a terminal device.

The duplication transmission configuration information includes configurations of a duplication transmission mode and/or duplication transmission content of the terminal device. The configuration of the duplication transmission mode is used to instruct the terminal device whether to perform duplication transmission, or instruct the terminal device to perform duplication transmission on at least two links. The configuration of the duplication transmission content is used to indicate DRB data and/or signaling data on which the terminal device performs duplication transmission. For URLLC service data to be transmitted by the terminal device, the RAN device may determine a duplication transmission configuration of the terminal device based on network load of a network, radio channel quality of the terminal device, performance of a URLLC service that is currently running in the network, and the like. For example, if the current network is not overloaded and the radio channel quality of the terminal device is not high, the RAN device may configure the terminal device to perform duplication transmission; or when the network is overloaded and the radio channel quality of the terminal device is high, the RAN device may configure the terminal device not to perform duplication transmission. Alternatively, the RAN device may obtain the duplication transmission configuration information of the terminal device from another network device (for example, a core network device), to determine the duplication transmission configuration of the terminal device. Similarly, the RAN device may further configure, based on load of user plane data and control plane data in the network, latency performance, and the like, the terminal device to perform duplication transmission on the DRB data and the signaling data. It should be understood that, when the terminal device communicates with at least two RAN devices, the RAN device is a master RAN device in the at least two RAN devices.

Optionally, the duplication transmission configuration information instructs the terminal device to enable (activate) or disable (deactivate) duplication transmission. For example, the RAN device may instruct, by using 1-bit configuration information, the terminal device to enable (activate) or disable (deactivate) duplication transmission. When there are two links between the terminal device and the RAN device, the RAN device instructs the terminal device to enable duplication transmission. This corresponds to that the RAN device configures the terminal device to perform duplication transmission on the two links.

Optionally, the duplication transmission configuration information further configures the terminal device to perform duplication transmission on a specified quantity of at least two links. The RAN device may configure the terminal device to perform duplication transmission on the at least two links on which the terminal device communicates with the RAN device. For example, because radio channel quality of different links may vary, the RAN device may specify the terminal device to perform duplication transmission on some links that are in the at least two links and that have high radio channel quality. For example, the RAN device may instruct, by using multi-bit configuration information, the terminal device to perform duplication transmission on the at least two links. For example, the RAN device may instruct, by using 2-bit configuration information, the terminal device to perform duplication transmission on four links at most. In addition, the RAN device may further instruct, in a form of a link identity or a link sequence number, the terminal device to perform duplication transmission on the at least two specified links. For example, the RAN device may configure the terminal device to perform duplication transmission on two links corresponding to a first link identity and a second link identity.

Optionally, the duplication transmission configuration information configures the terminal device to perform duplication transmission on data of at least one DRB. For example, the RAN device may send an identity of at least one DRB on which duplication transmission is to be performed by the terminal device, to the terminal device by using the duplication transmission configuration information. In addition, the duplication transmission configuration information may further configure the terminal device to perform duplication transmission on data of at least one piece of signaling. For example, the signaling may be radio resource control (RRC) signaling, a PDCP control message (for example, a PDCP state report, and header compression control information), an RLC state report, a MAC control message (for example, a MAC control element (CE)), and the like.

202. The terminal device performs duplication transmission based on a duplication transmission configuration.

In this step, the terminal device configures the duplication transmission mode and/or the duplication transmission content based on the duplication transmission configuration information obtained from step 201, and performs duplication transmission based on the configurations.

Optionally, the terminal device decides, based on a status of the terminal device on each link, to perform duplication transmission on at least two links or perform duplication transmission on at least two links configured by the RAN device. For example, if the RAN device only configures the terminal device to enable duplication transmission or only instructs the terminal device to perform duplication transmission on the specified quantity of at least two links, the terminal device can decide, in all links, specific links on which duplication transmission is to be performed. If the RAN device configures at least two links for the terminal device to perform duplication transmission, the terminal device performs duplication transmission on the at least two specified links. In a duplication transmission mode, the terminal device sends a grant request to the RAN device, and after receiving a transmission grant sent by the RAN device, performs duplication transmission on the at least two links based on a resource granted by the RAN device. In another duplication transmission mode, the terminal device does not need to send a grant request to the RAN device, but performs duplication transmission on the at least two links in a (grant-free or grant-less) mode. There are a plurality of modes for duplication transmission by the terminal device, and the modes are not limited in this specification.

Optionally, before step 202, the method 200 further includes step 203. In step 203, the terminal device sends a duplication transmission configuration response to the RAN device. The response is used to indicate that the terminal device successfully receives the duplication transmission configuration information sent by the RAN device.

According to the steps described above, the RAN device configures duplication transmission to be performed by the terminal device, and the terminal device performs duplication transmission based on the duplication transmission configuration, thereby improving robustness of data transmission of the terminal device.

Figure 3:
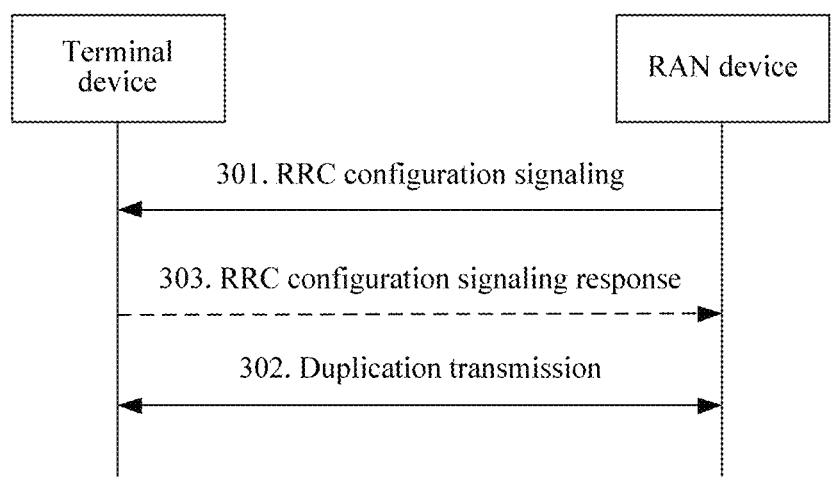
FIG. 3 is a schematic flowchart of another type of duplication transmission according to an embodiment of this application.

FIG. 3 is a schematic flowchart of another duplication transmission method 300 according to an embodiment of this application. The method 300 may be applied to the communication scenarios shown in FIG. 1 and includes the following steps.

301. A RAN device sends RRC configuration signaling to a terminal device, where the RRC configuration signaling is used to configure duplication transmission to be performed by the terminal device.

The RRC configuration signaling includes a DRB identity and/or a signaling type on which duplication transmission is to be performed.

Optionally, as shown in Table 1, the RRC configuration signaling indicates whether a DRB whose identity is DRB-Identity needs to perform duplication transmission. Redundancy-indication is a Boolean variable. For example, when the value is 1, duplication transmission of the DRB is enabled (activated); or when the value is 0, duplication transmission of the DRB is disabled (deactivated). Further, the RRC configuration signaling may further include a plurality of DRB-Identity to configure to enable (activate) or disable (deactivate) duplication transmission of a plurality of DRBs. For the various scenarios shown in FIG. 1, DRB-Identity may be used to indicate a DRB on which duplication transmission needs to be performed. For the various scenarios shown in FIG. 1, a form shown in Table 1 may be used to indicate a DRB on which duplication transmission needs to be performed.

TABLE 1

| DRB-redundancy ::= | SEQUENCE { |
| DRB-Identity | DRB-Identity, |
| redundancy-indication | BOOLEAN |
| } | |

Optionally, as shown in Table 2, the RRC configuration signaling indicates a type of signaling on which duplication transmission needs to be performed, for example, RRC signaling, a PDCP control message, and a MAC control message. For example, when RRC-redundancy-indication in Table 2 has a value of 1, it instructs to enable (activate) duplication transmission of the RRC signaling, or when RRC-redundancy-indication has a value of 0, it instructs to disable (deactivate) duplication transmission of the RRC signaling. Similarly, PDCP-redundancy-indication is used to instruct to enable (activate) or disable (deactivate) duplication transmission of the PDCP control message. MAC-redundancy-indication is used to instruct to enable (activate) or disable (deactivate) duplication transmission of the MAC control message. For the scenario shown in FIG. 1(b), Table 2 may be used to indicate the duplication transmission of the RRC signaling and the PDCP control message. For the scenario shown in FIG. 1(c) to FIG. 1(e), Table 2 may be used to indicate the duplication transmission of the RRC signaling, the PDCP control message, and the MAC control message.

TABLE 2

| Signaling-redundancy ::= | SEQUENCE { |
| RRC-redundancy-indication | BOOLEAN, |
| PDCP-redundancy-indication | BOOLEAN, |
| MAC-redundancy-indication | BOOLEAN |
| } | |

Optionally, the RRC configuration signaling further indicates at least two links for duplication transmission of DRB data and/or signaling data.

For example, for the scenario shown in FIG. 1(c), Table 3(a) shows configuration information for duplication transmission of one piece of DRB data on at least two carriers/cells. LogicalChannelIdentityList represents a list of at least two LCs for duplication transmission of the DRB data. The list may include identities (ID) of the at least two LCs, and a quantity of LC IDs included in the list corresponds to a quantity of links for duplication transmission of the DRB data. In this way, the RRC configuration signaling may instruct the terminal device to perform duplication transmission on a specified quantity of at least two links, and the terminal device decides specific links used for duplication transmission. Further, Table 3(a) may further include a cell identity list CellIdentityList, and CellIdentityList represents a list of cell identities transmitted in each piece of LC data in LogicalChannelIdentityList. It should be understood that, in the scenario shown in FIG. 1(c), one LC corresponds to one cell. Optionally, LC data corresponding to the first LC ID in LogicalChannelIdentityList is transmitted in a cell corresponding to the first Cell ID in CellIdentityList. In this way, the RRC configuration signaling may instruct the terminal device to perform duplication transmission on the at least two specified links. Particularly, when the list includes only one LC ID, it indicates that the RAN device instructs the terminal device to perform transmission on only one link. In addition, the RRC configuration signaling may further include at least two DRB-Identity for configuring duplication transmission of at least two pieces of DRB data. Similarly, for the scenario shown in FIG. 1(d), Table 3(b) shows configuration information for duplication transmission of one piece of DRB data by using at least two types of numerologies. In this case, one LC corresponds to one type of numerology. Therefore, Numerology-TTI-List is used to represent a list of numerology identities or sequence numbers transmitted in each piece of LC data in LogicalChannelIdentityList. Similarly, for the scenario shown in FIG. 1(e), Table 3(c) shows configuration information for duplication transmission of one piece of DRB data through at least two antenna ports. In this case, one LC corresponds to one antenna port. Therefore, Antenna-port-List is used to represent a list of antenna port identities or sequence numbers transmitted in each piece of LC data in LogicalChannelIdentityList. It should be understood that, LogicalChannelIdentityList, CellIdentityList, Numerology-TTI-List, and Antenna-port-List may have other names, provided that the names can represent a list of identities of at least two logical channels, a list of identities of at least two cells, a list of identities of at least two types of numerologies, and a list of identities of at least two antenna ports. This is not limited in this specification.

For a case in which the RRC configuration signaling indicates duplication transmission of signaling, correspondingly, DRB-redundancy and DRB-Identity in Table 3(a) to Table 3(c) may be replaced with SRB-redundancy and SRB-Identity respectively.

TABLE 3(a)

| | |
|---|---|
| DRB-redundancy ::= | SEQUENCE { |
| DRB-Identity | DRB-Identity, |
| LogicalChannelIdentityList | LogicalChannelIdentityList |
| CellIdentityList | CellIdentityList |
| redundancy-indication | BOOLEAN |
| } | |
| LogicalChannelIdentitylist::= | SEQUENCE (SIZE (1..maxLC)) OF |
| LogicalChannelIdentity | LogicalChannelIdentity |
| LogicalChannelIdentity | INTEGER (3..10) |
| CellIdentityList ::= | SEQUENCE (SIZE (1..maxSCell)) OF cellidentity |
| cellidentity | cellidentity |

TABLE 3(b)

| | |
|---|---|
| DRB-redundancy ::= | SEQUENCE { |
| DRB-Identity | DRB-Identity, |
| LogicalChannelIdentityList | LogicalChannelIdentityList |
| Numerology-TTI-List | Numerology-TTI-List |
| redundancy-indication | BOOLEAN |
| } | |
| LogicalChannelIdentitylist::= | SEQUENCE (SIZE (1..maxLC)) OF |
| LogicalChannelIdentity | LogicalChannelIdentity |
| LogicalChannelIdentity | INTEGER (3..10) |
| Numerology-TTI-List ::= | SEQUENCE (SIZE (1..maxNum)) |
| OF Numerology-TTI | |
| Numerology-TTI | Numerology-TTI |

TABLE 3(c)

| | |
|---|---|
| DRB-redundancy ::= | SEQUENCE { |
| DRB-Identity | DRB-Identity, |
| LogicalChannelIdentityList | LogicalChannelIdentityList |
| Antenna-port-List | Antenna-port-List |
| redundancy-indication | BOOLEAN |
| } | |
| LogicalChannelIdentitylist::= | SEQUENCE (SIZE (1..maxLC)) OF |
| LogicalChannelIdentity | LogicalChannelIdentity |
| LogicalChannelIdentity | INTEGER (3..10) |
| Antenna-port-List ::= | SEQUENCE (SIZE (1..maxNum)) OF Antenna-port |
| Antenna-port | Antenna-port |

For example, for the scenario shown in FIG. 1(b), Table 4 shows configuration information for duplication transmission of one piece of DRB data in at least two cells managed by at least two RAN devices. The terminal device may communicate with at least one cell in a master cell group (MCG) managed by a master RAN device (for example, the RAN device 101 in FIG. 1), and communicate with at least one cell in a secondary cell group (SCG) managed by a secondary RAN device (for example, the RAN device 102 in FIG. 1). MCGcellIdentityList identifies a list of identities of at least one cell that is managed by at least one master RAN device and that is used for duplication transmission of the DRB data. SCGcellIdentitylist represents a list of identities of at least one cell that is of at least one secondary RAN device and that is used for duplication transmission of the DRB data. Further, the RRC configuration signaling may further include a plurality of DRB-Identity to configure duplication transmission of a plurality of DRBs.

TABLE 4

| | | | |
|---|---|---|---|
| DRB-redundancy | | ::= | SEQUENCE { |
| DRB-Identity | | | DRB-Identity, |
| MCGcellIdentitylist | | | MCGcellIdentitylist |
| SCGcellIdentitylist | | | SCGcellIdentitylist |
| redundancy-indication | | | BOOLEAN |
| } | | | |
| SCGcellIdentitylist | ::= | SEQUENCE (SIZE (1..maxNodeID)) OF SCGcellIdentity | |
| SCGcellIdentity | ::= | SCGcellIdentity | |
| MCGcellIdentitylist | | ::= | SEQUENCE (SIZE (1..maxcell)) OF MCGcellIdentity |
| MCGcellIdentity | ::= | MCGcellIdentity | |

Optionally, the RRC configuration signaling may be an RRC connection reconfiguration message, an RRC connection resume message, an RRC connection reestablishment message, or the like.

302. The terminal device performs duplication transmission based on the RRC configuration signaling.

In this step, the terminal device configures a duplication transmission mode and/or duplication transmission content based on the RRC configuration signaling obtained from step 301, and performs duplication transmission based on the configuration.

Optionally, the terminal device decides, based on a status of the terminal device on each link, to perform duplication transmission on at least two links or perform duplication transmission on at least two links configured by the RAN device. For example, if the RAN device only configures the terminal device to enable duplication transmission or only instructs the terminal device to perform duplication transmission on the specified quantity of at least two links, the terminal device can decide, in all links, specific links on which duplication transmission is to be performed. If the RAN device configures at least two links for the terminal device to perform duplication transmission, the terminal device performs duplication transmission on the at least specified two links. In a duplication transmission mode, the terminal device sends a grant request to the RAN device, and after receiving a transmission grant sent by the RAN device, performs duplication transmission on at least two links based on a resource granted by the RAN device. In another duplication transmission mode, the terminal device does not need to send a grant request to the RAN device, but performs duplication transmission on at least two links in a (grant-free or grant-less) mode. There are a plurality of modes for duplication transmission by the terminal device, and the modes are not limited in this specification.

Optionally, before step 302, the method 30o further includes step 303. In step 303, the terminal device sends an RRC configuration signaling response to the RAN device. The response is used to indicate that the terminal device successfully receives the RRC configuration signaling sent by the RAN device. Optionally, the RRC configuration signaling may correspondingly be an RRC connection reconfiguration complete message, an RRC connection resume complete message, an RRC connection reestablishment complete message, or the like.

According to the steps described above, the RAN device configures, by using the RRC signaling, duplication transmission to be performed by the terminal device, and the terminal device performs duplication transmission based on the duplication transmission configuration, thereby improving robustness of transmission of the terminal device.

Figure 4:
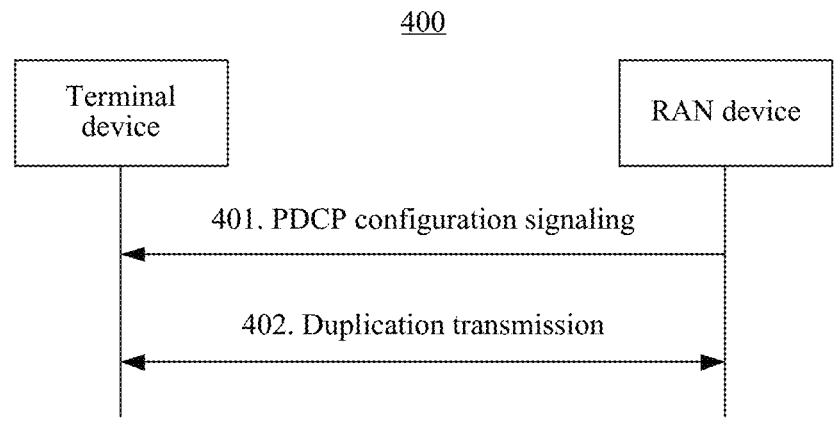
FIG. 4 is a schematic flowchart of still another type of duplication transmission according to an embodiment of this application.

FIG. 4 is a schematic flowchart of still another duplication transmission method 400 according to an embodiment of this application. The method 400 may be applied to the communication scenarios shown in FIG. 1 and includes the following steps.

401. A RAN device sends PDCP configuration signaling to a terminal device, where the PDCP configuration signaling is used to configure duplication transmission to be performed by the terminal device.

The PDCP configuration signaling may include DRB data or signaling radio bearer (SRB) data on which duplication transmission is to be performed.

For a DRB or an SRB transmitted in a process of communication between the terminal device and the RAN device, there is a corresponding PDCP entity that is on each of the terminal device and the RAN device and that processes corresponding DRB data or SRB data on a PDCP layer. Therefore, for any DRB or SRB, the RAN device may have a piece of corresponding PDCP configuration signaling for configuring duplication transmission of the DRB data or the SRB data.

Figure 5:
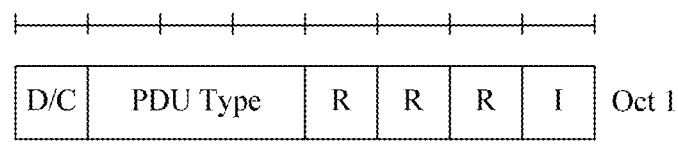
FIG. 5 is a schematic diagram of PDCP configuration signaling according to an embodiment of this application.

Optionally, the PDCP configuration signaling may use a format shown in FIG. 5. A bit D/C is used to represent a PDCP protocol data unit (PDU) is a control PDU or a data PDU. PDU Type is used to represent a type of the PDCP PDU. A bit R is used to represent a reserved bit. A bit I is used to represent a duplication transmission instruction. In this embodiment of this application, for the PDCP configuration signaling used for duplication transmission, the bit D/C may be set to 1, indicating that the PDCP PDU is a control message; PDU Type is set to a multi-bit value (for example, 110), indicating that the PDCP PDU is a duplication transmission control message and is used to configure duplication transmission of the DRB data or the SRB data corresponding to the PDCP layer of the terminal device. Setting the duplication transmission instruction I to 1 instructs to perform duplication transmission on the DRB data or the SRB data corresponding to the PDCP layer, and setting the duplication transmission instruction I to 0 instructs not to perform duplication transmission on the DRB data or the SRB data corresponding to the PDCP layer. For all the scenarios shown in FIG. 1, the PDCP configuration signaling in this embodiment of this application may be used to configure duplication transmission to be performed by the terminal device.

402. The terminal device performs duplication transmission based on the PDCP configuration signaling.

In this step, the terminal device configures a duplication transmission mode and/or duplication transmission content based on the PDCP configuration signaling obtained from step 401, and performs duplication transmission based on the configuration.

Optionally, the terminal device decides, based on a status of the terminal device on each link, to perform duplication transmission on at least two links. In a duplication transmission mode, the terminal device sends a grant request to the RAN device, and after receiving a transmission grant sent by the RAN device, performs duplication transmission on the at least two links based on a resource granted by the RAN device. In another duplication transmission mode, the terminal device does not need to send a grant request to the RAN device, but performs duplication transmission on at least two links in a (grant-free or grant-less) mode. There are a plurality of modes for duplication transmission by the terminal device, and the modes are not limited in this specification.

According to the steps described above, the RAN device configures, by using the PDCP signaling, duplication transmission to be performed by the terminal device, and the terminal device performs duplication transmission based on the duplication transmission configuration, thereby improving robustness of data transmission of the terminal device.

Figure 6:
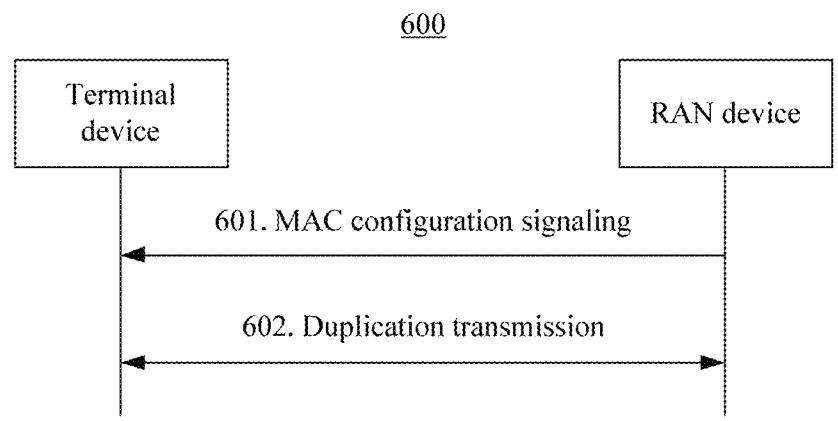
FIG. 6 is a schematic flowchart of still another type of duplication transmission according to an embodiment of this application.

FIG. 6 is a schematic flowchart of still another duplication transmission method 600 according to an embodiment of this application. The method 60o may be applied to the communication scenarios shown in FIG. 1 and includes the following steps.

601. A RAN device sends MAC configuration signaling to a terminal device, where the MAC configuration signaling is used to configure duplication transmission to be performed by the terminal device.

Figure 7:
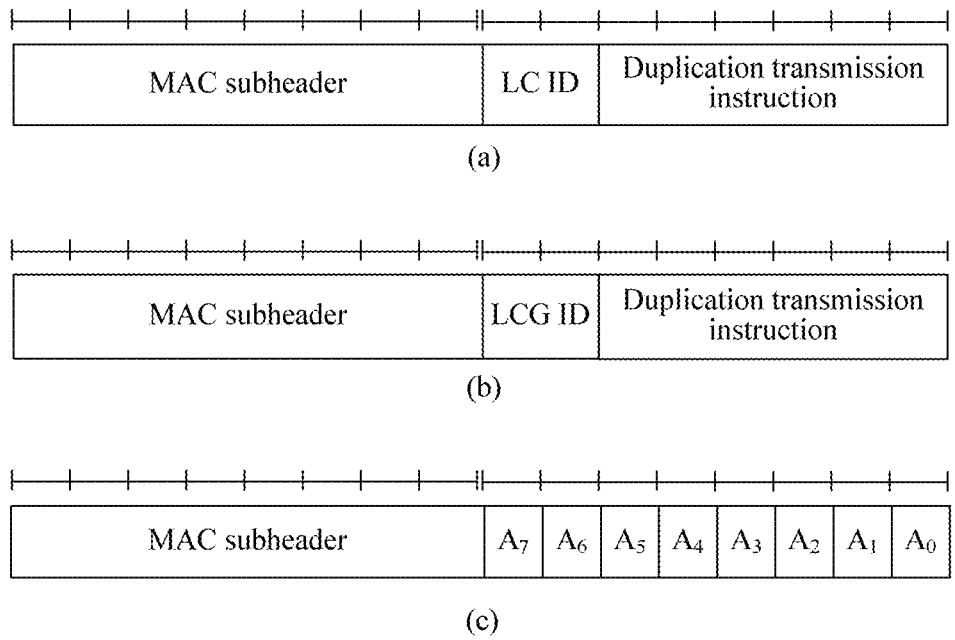
FIG. 7 is a schematic diagram of MAC configuration signaling according to an embodiment of this application.

The MAC configuration signaling may be sent to the terminal device by using a MAC CE. FIG. 7 is a schematic diagram of configuring, by using the MAC CE, duplication transmission to be performed by the terminal device according to an embodiment of the present invention. The MAC CE includes a MAC subheader, an LC ID or a logical channel group (LCG) identity, and a duplication transmission instruction. Optionally, in FIG. 7(a), the MAC CE of the RAN device includes an LC ID corresponding to LC data on which duplication transmission needs to be performed and a corresponding duplication transmission instruction. The MAC subheader is used to indicate that the MAC CE is used to configure duplication transmission to be performed by the terminal device. The duplication transmission instruction may be i-bit indication information and used to instruct to enable (activate) or disable (deactivate) duplication transmission of the LC. For example, when the duplication transmission instruction has a value of 1, it indicates that the terminal device needs to perform duplication transmission on the LC data, or when the duplication transmission instruction has a value of 0, it indicates that the terminal device does not need to perform duplication transmission on the LC data. In addition, as shown in FIG. 7(b), the MAC CE of the RAN device may further include an LCG ID corresponding to LCG data on which duplication transmission needs to be performed and a corresponding duplication transmission instruction. The duplication transmission instruction is used to instruct to enable (activate) or disable (deactivate) duplication transmission of the LCG data. Further, the duplication transmission instructions in FIGS. 7(a) and 7(b) may further use multiple bits to indicate duplication transmission of the LC/LCG data. For example, when the duplication transmission instruction is two bits and has a value of 00, it instructs to perform duplication transmission for one time on the LC/LCG data identified by the LC/LCG ID; when the duplication transmission instruction is two bits and has a value of 01, it instructs to perform duplication transmission for two times on the LC/LCG data identified by the LC/LCG ID; when the duplication transmission instruction is two bits and has a value of 10, it instructs to perform duplication transmission for three times on the LC/LCG data identified by the LC/LCG ID; or when the duplication transmission instruction is two bits and has a value of 11, it instructs to perform duplication transmission for fourth times on the LC/LCG data identified by the LC/LCG ID. Optionally, a MAC CE shown in FIG. 7(c) may alternatively be used to configure duplication transmission. In this way, the MAC CE includes an indication of an LC that needs duplication transmission. For example, A0 to A7 are an 8-bit indication. When Ai has a value of 1, it instructs to enable (activate) duplication transmission of LC data corresponding to an LC ID that has a sequence number of i, and when Ai has a value of 0, it instructs to disable (deactivate) duplication transmission of LC data corresponding to an LC ID that has a sequence number of i. For all the scenarios shown in FIG. 1, the MAC configuration signaling in this embodiment of this application may be used to configure duplication transmission to be performed by the terminal device.

602. The terminal device performs duplication transmission based on the MAC configuration signaling.

In this step, the terminal device configures a duplication transmission mode and/or duplication transmission content based on the MAC configuration signaling obtained from step 601, and performs duplication transmission based on the configuration.

Optionally, the terminal device decides, based on a status of the terminal device on each link, to perform duplication transmission on at least two links or perform duplication transmission on at least two links configured by the RAN device. For example, if the RAN device only configures the terminal device to enable duplication transmission or only instructs the terminal device to perform duplication transmission on the specified quantity of at least two links, the terminal device can decide, in all links, specific links on which duplication transmission is to be performed. If the RAN device configures at least two links for the terminal device to perform duplication transmission, the terminal device performs duplication transmission on the at least specified two links. In a duplication transmission mode, the terminal device sends a grant request to the RAN device, and after receiving a transmission grant sent by the RAN device, performs duplication transmission on at least two links based on a resource granted by the RAN device. In another duplication transmission mode, the terminal device does not need to send a grant request to the RAN device, but performs duplication transmission on at least two links in a (grant-free or grant-less) mode. There are a plurality of modes for duplication transmission by the terminal device, and the modes are not limited in this specification.

Further, in the scenario in FIG. 1(c), for duplication transmission of data in an RLC unacknowledge mode (UM), because radio channel quality of a plurality of links is different, transmission rates of the data on various carriers are different, and as a result, transmission of the data on some carriers of poor radio channel quality may be invalid. Therefore, in a duplication transmission process, a PDCP entity of the terminal device may obtain, from a PDCP state report sent by the RAN device, a state in which the terminal device performs duplication transmission on each link, and learn, for example, specific links on which transmission has been completed and specific links on which transmission has not been completed; the PDCP entity of the terminal device sends a PDCP PDU sending state report to the RLC entity of the terminal device, for example, a report indicating that the PDCP PDU has been successfully sent; and the RLC entity of the terminal device discards an invalid PDCP PDU based on the PDCP PDU sending state report, for example, discards a PDCP PDU that is in the RLC entity and that has not been transmitted.

According to the steps described above, the RAN device configures, by using the MAC signaling, duplication transmission to be performed by the terminal device, and the terminal device performs duplication transmission based on the duplication transmission configuration, thereby improving robustness of data transmission of the terminal device.

Figure 8:
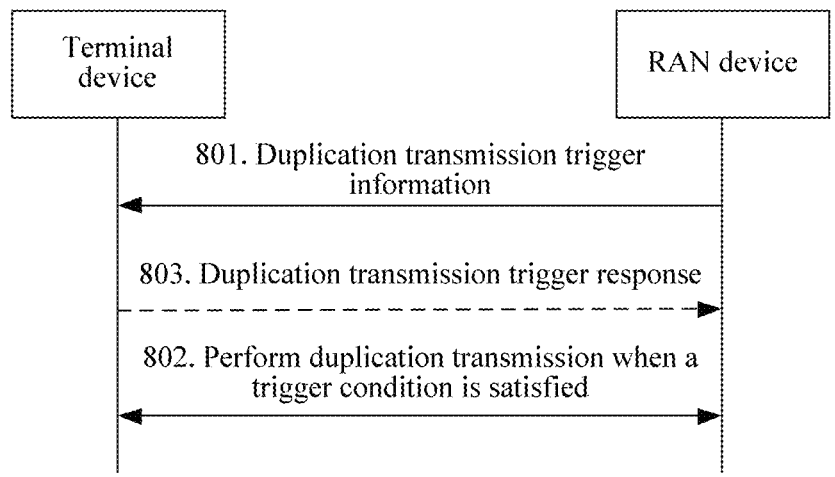
FIG. 8 is a schematic flowchart of still another type of duplication transmission according to an embodiment of this application.

FIG. 8 is a schematic flowchart of still another duplication transmission method 800 according to an embodiment of this application. The method 800 may be applied to the various communication scenarios shown in FIG. 1 and includes the following steps.

801. A RAN device sends duplication transmission trigger information to a terminal device, where the duplication transmission trigger information is used to configure a trigger condition of performing, by the terminal device, duplication transmission.

The duplication transmission trigger information includes a threshold, of at least one type of network metric of at least one link, triggering duplication transmission. Optionally, the network metric is reference signal received power (RSRP), reference signal received quality (RSRQ), a packet loss rate, and a quantity of retransmission times of an automatic repeat request (ARQ), or the like of a link. For example, as shown in Table 5, the duplication transmission trigger information indicates an RSRP/RSRP threshold that triggers duplication transmission of a link whose identity is Link-ID. For example, RSRP_threshold/RSRQ_threshold instructs to trigger duplication transmission of data of the link when an RSRP/RSRQ measurement value of the link is less than or equal to RSRP_threshold/RSRQ_threshold; or instructs not to trigger duplication transmission of data of the link when an RSRP/RSRQ measurement value of the link is greater than RSRP_threshold/RSRQ_threshold. It should be understood that, the duplication transmission of the data of the link may be duplication transmission of DRB data of the link or may be duplication transmission of signaling data of the link. For example, for the scenarios in FIG. 1(b) and FIG. 1(c), Link-ID may be a cell ID, and corresponds to a cell connected to the terminal device; for the scenario shown in FIG. 1(d), Link-ID may be a subcarrier spacing/cyclic prefix length indication, and corresponds to a type of numerology connected to the terminal device; and for the scenario shown in FIG. 1(e), Link-ID may be an antenna port identity or a port sequence number corresponding to a channel state information-reference signal (CSI-RS). In addition, the Link-ID may alternatively be an identity such as LogicalChannelIdentity, SCGcellIdentity, MCGcellIdentity, Numerology-TTI-ID, and Antenna-port-ID, which may be used to distinguish between different links. It should be understood that, the cell ID, the subcarrier spacing/cyclic prefix length indication, SCGcellIdentity, MCGcellIdentity, Numerology-TTI-ID, and Antenna-port-ID may have other names, provided that the names can represent an identity of a logical channel, an identity of a cell, an identity of a type of numerology, and an identity of an antenna port. This is not limited in this specification.

TABLE 5

| RSRP/RSRQ -redundancy ::= | SEQUENCE { |
|---|---|
| Link-ID | Link-ID, |
| RSRP-threshold | RSRP-threshold, |
| RSRQ-threshold | RSRQ-threshold |
| } | |

For example, as shown in Table 6, the duplication transmission trigger information indicates a threshold of a packet loss rate in duplication transmission of a DRB whose trigger identity is DRB-Identity. For example, when the packet loss rate in a PDCP state report of the DRB whose identity is DRB-Identity is higher than Missing-threshold, duplication transmission of data of the DRB is triggered; or when the packet loss rate is not lower than Missing-threshold, duplication transmission is not performed on data of the DRB. For the various scenarios shown in FIG. 1, the manner in this embodiment of this application may be used to indicate triggering of the duplication transmission of the data of the DRB. For a case of triggering duplication transmission of data of an SRB, similarly, DRB-Identity in Table 6 only needs to be replaced with SRB-Identity.

TABLE 6

| Status-report-redundancy ::= SEQUENCE { | |
|---|---|
| DRB-Identity | DRB-Identity, |
| Missing-threshold | Missing-threshold |
| } | |

For example, as shown in Table 7, the duplication transmission trigger information indicates that a threshold of a quantity of retransmission times of an ARQ, on which duplication transmission is performed, of a DRB whose trigger identity is DRB-Identity. For example, when a quantity of retransmission times of an ARQ of an LC whose identity is LogicalChannelIdentity in a DRB whose identity is DRB-Identity is higher than ARQ-threshold, duplication transmission of the data of the LC is triggered; or when a quantity of retransmission times of the ARQ is not lower than ARQ-threshold, duplication transmission is not performed on data of the LC. For the various scenarios shown in FIG. 1, the manner in this embodiment of this application may be used to indicate triggering of the duplication transmission of the data of the DRB. For a case of triggering duplication transmission of data of an SRB, similarly, DRB-Identity in Table 7 only needs to be replaced with SRB-Identity.

TABLE 7

| RSRP/RSRQ -redundancy ::= | SEQUENCE { |
|---|---|
| DRB-Identity | DRB-Identity, |
| logicalChannelIdentity | INTEGER (3..10), |
| ARQ-threshold | ARQ-threshold |
| } | |

802. The terminal device performs duplication transmission based on the duplication transmission trigger information.

In this step, the terminal device compares a measured network metric based on the duplication transmission trigger information obtained from step 801, for example, compares a measured RSRP/RSRQ value of a link with corresponding RSRP_threshold/RSRQ_threshold in the duplication transmission trigger information, compares a packet loss rate in a PDCP state report with corresponding Missing-threshold in the duplication transmission trigger information, and compares a quantity of retransmission times of an ARQ of an LC with corresponding ARQ-threshold in the duplication transmission trigger information, and when at least one trigger condition is satisfied, duplication transmission is performed on the data of the link.

Optionally, in a duplication transmission mode, the terminal device decides, based on a status of the terminal device on each link, to perform duplication transmission on at least two links. The terminal device sends a grant request to the RAN device, and after receiving a transmission grant sent by the RAN device, performs duplication transmission on the at least two links based on a resource granted by the RAN device. In another duplication transmission mode, alternatively, the terminal device may not need to send a grant request to the RAN device, but performs duplication transmission on the at least two links in a (grant-free or grant-less) mode. There are a plurality of modes for duplication transmission by the terminal device, and the modes are not limited in this specification.

Optionally, the terminal device decides, based on a status of the terminal device on each link, to perform duplication transmission on at least two links or perform duplication transmission on at least two links configured by the RAN device. For example, if the RAN device only configures the terminal device to enable duplication transmission or only instructs the terminal device to perform duplication transmission on the specified quantity of at least two links, the terminal device can decide, in all links, specific links on which duplication transmission is to be performed. If the RAN device configures at least two links for the terminal device to perform duplication transmission, the terminal device performs duplication transmission on the at least specified two links. In a duplication transmission mode, the terminal device sends a grant request to the RAN device, and after receiving a transmission grant sent by the RAN device, performs duplication transmission on at least two links based on a resource granted by the RAN device. In another duplication transmission mode, the terminal device does not need to send a grant request to the RAN device, but performs duplication transmission on at least two links in a (grant-free or grant-less) mode. There are a plurality of modes for duplication transmission by the terminal device, and the modes are not limited in this specification.

Optionally, before step 802, the method 800 further includes step 803. In step 803, the terminal device sends a duplication transmission trigger response to the RAN device. The response is used to indicate that the terminal device successfully receives the duplication transmission trigger information sent by the RAN device.

It should be understood that, for convenience of description, information sent by the RAN device to the terminal device in this specification is referred to as the duplication transmission configuration information or the duplication transmission trigger information. However, the information sent by the radio access network device to the terminal device may have other names, for example, data duplication transmission configuration information, packet duplication transmission configuration information, data duplication transmission trigger information, and packet duplication transmission trigger information. Specific information names of the information sent by the radio access network device to the terminal device are not limited thereto in this specification. It may be understood that, the configuration information herein is not a proper noun, and may use other names in an actual application, and however, the names do not depart from the essence of this patent application. In addition, the foregoing information and the different types of signaling (for example, the RRC configuration signaling, the PDCP configuration signaling, and the MAC configuration signaling) exchanged between the RAN device and the terminal device in this specification may be carried in a message of any name. This is not limited in this specification.

All or some of the foregoing embodiments may be implemented by using software, hardware, firmware, or any combination thereof. When the software is used to implement the embodiments, the embodiments may be implemented or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. A person skilled in the art may use different methods to implement the described functions for each particular application, but it should not be considered that the implementation goes beyond the scope of this patent application.

The foregoing describes the method embodiments in this application in detail with reference to FIG. 2 to FIG. 8, and the following describes apparatus embodiments in this application in detail with reference to FIG. 9 to FIG. 12. It should be understood that, the apparatus embodiments and the method embodiments correspond to each other, and for a similar description, refer to the method embodiments. It should be noted that, the apparatus embodiments may be used in cooperation with the foregoing methods, or may be separately used.

Figure 9:
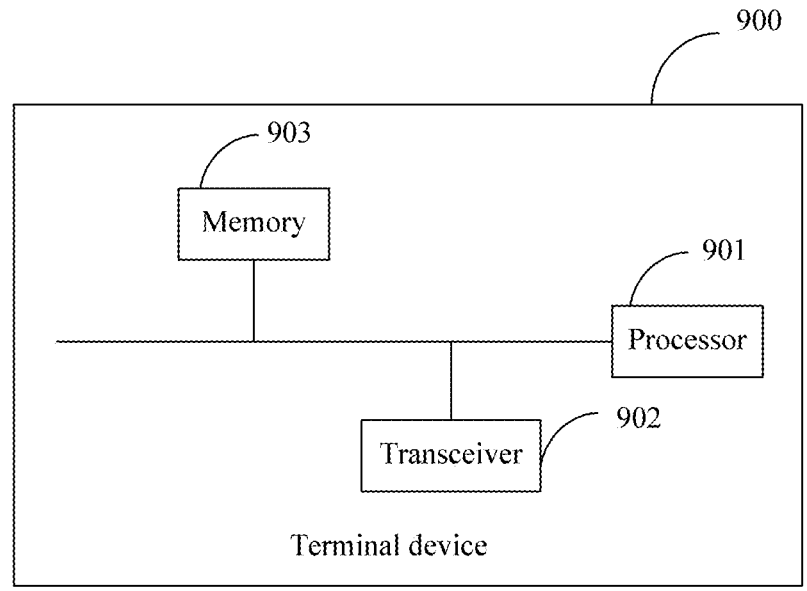
FIG. 9 is a schematic block diagram of a terminal device according to an embodiment of this application.

FIG. 9 is a schematic block diagram of a terminal device 900 according to an embodiment of this application. The terminal device 900 may correspond to (for example, the terminal device 900 may be configured as or may be) the terminal device described in the foregoing method 200, the terminal device described in the foregoing method 300, the terminal device described in the foregoing method 400, the terminal device described in the foregoing method 600, or the terminal device described in the foregoing method 800. The terminal device 900 may include: a processor 901 and a transceiver 902, and the processor 901 and the transceiver 902 are in communication connection. Optionally, the terminal device 900 further includes a memory 903, and the memory 903 and the processor 901 are in communication connection. Optionally, the processor 901, the memory 903, and the transceiver 902 may be in communication connection, the memory 903 may be configured to store an instruction, and the processor 901 is configured to execute the instruction stored in the memory 903, to control the transceiver 902 to send information or a signal. The processor 901 and the transceiver 902 are configured to separately perform actions or processing processes performed by the terminal device in the foregoing method 200, the terminal device in the foregoing method 300, the terminal device in the foregoing method 400, the terminal device in the foregoing method 600, or the terminal device in the foregoing method 800. Herein, to avoid repetition, detailed descriptions are omitted.

Figure 10:
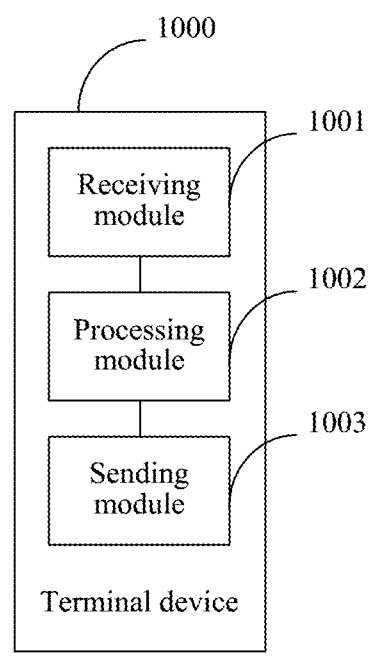
FIG. 10 is another schematic block diagram of a terminal device according to an embodiment of this application.

FIG. 10 is another schematic block diagram of a terminal device 1000 according to an embodiment of this application. The terminal device 1000 may correspond to (for example, the terminal device 1000 may be configured as or may be) the terminal device described in the foregoing method 200, the terminal device described in the foregoing method 300, the terminal device described in the foregoing method 400, the terminal device described in the foregoing method 600, or the terminal device described in the foregoing method 800. The terminal device 1000 may include a receiving module 1001, a processing module 1002, and a sending module 1003, and the processing module 1002 is in communication connection with the receiving module 1001 and the sending module 1003. The modules in the terminal device 1000 are configured to perform actions or processing processes performed by the terminal device in the foregoing method 200, the terminal device in the foregoing method 300, the terminal device in the foregoing method 400, the terminal device in the foregoing method 600, or the terminal device in the foregoing method 800. Herein, to avoid repetition, detailed descriptions are omitted.

Figure 11:
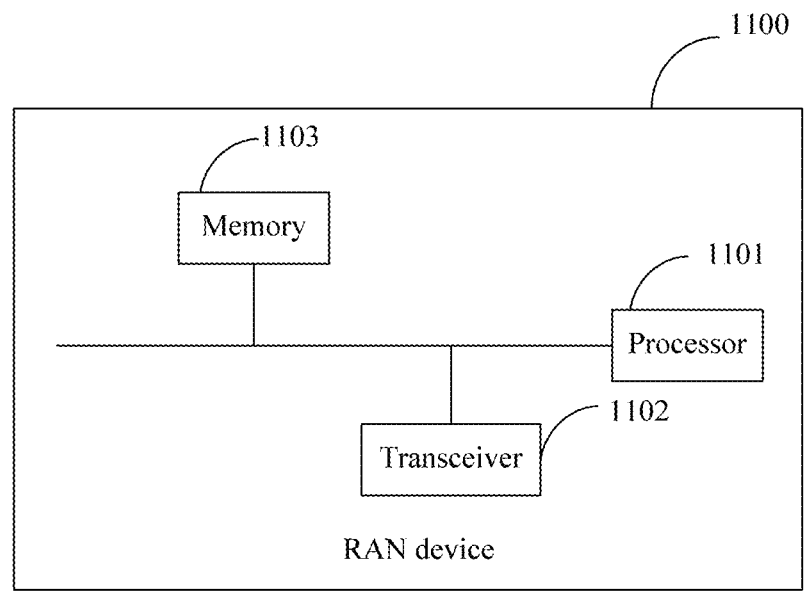
FIG. 11 is a schematic block diagram of a RAN device according to an embodiment of this application.

FIG. 11 is a schematic block diagram of a RAN device 1100 according to an embodiment of this application. The RAN device 1100 may correspond to (for example, the RAN device 1100 may be configured as or may be) the RAN device described in the foregoing method 200, the RAN device described in the foregoing method 300, the RAN device described in the foregoing method 400, the RAN device described in the foregoing method 600, or the RAN device described in the foregoing method 800. The RAN device 1100 may include: a processor 1101 and a transceiver 1102, and the processor 1101 and the transceiver 1102 are in communication connection. Optionally, the RAN device 1100 further includes a memory 1103, and the memory 1103 and the processor 1101 are in communication connection. Optionally, the processor 1101, the memory 1103, and the transceiver 1102 may be in communication connection, the memory 1103 may be configured to store an instruction, and the processor 1101 is configured to execute the instruction stored in the memory 1103, to control the transceiver 1102 to send information or a signal. The processor 1101 and the transceiver 1102 are configured to separately perform actions or processing processes performed by the RAN device in the foregoing method 200, the RAN device in the foregoing method 300, the RAN device in the foregoing method 400, the RAN device in the foregoing method 600, or the RAN device in the foregoing method 800. Herein, to avoid repetition, detailed descriptions are omitted.

Figure 12:
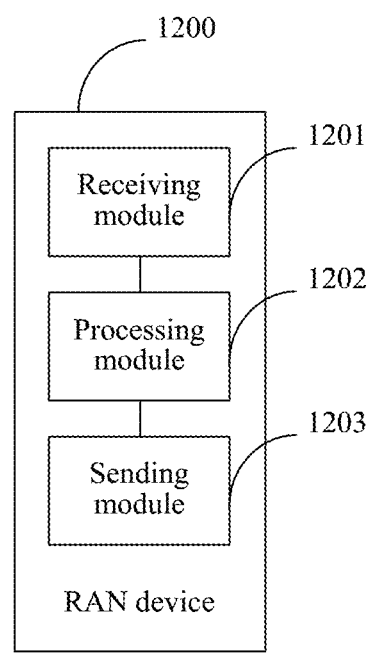
FIG. 12 is another schematic block diagram of a RAN device according to an embodiment of this application.

FIG. 12 is another schematic block diagram of a RAN device 1200 according to an embodiment of this application. The RAN device 1200 may correspond to (for example, the RAN device 1100 may be configured as or may be) the RAN device described in the foregoing method 200, the RAN device described in the foregoing method 300, the RAN device described in the foregoing method 400, the RAN device described in the foregoing method 600, or the RAN device described in the foregoing method 800. The RAN device 1200 may include a receiving module 1201, a processing module 1202, and a sending module 1203, and the processing module 1202 is in communication connection with the receiving module 1201 and the sending module 1203. The modules in the RAN device 1200 are configured to perform actions or processing processes performed by the RAN device in the foregoing method 200, the RAN device in the foregoing method 300, the RAN device in the foregoing method 400, the RAN device in the foregoing method 600, or the RAN device in the foregoing method 800. Herein, to avoid repetition, detailed descriptions are omitted.

It should be understood that, the processor (901, 1101) in the apparatus embodiments in this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field programmable gate array (FPGA), a generic array logic (GAL), or any combination thereof.

The memory (903, 1103) in the apparatus embodiments in this application may be a volatile memory, for example, a random access memory (RAM); or may be a non-volatile memory, for example, a read-only memory (ROM), a flash memory, a hard disk drive (HDD), or a solid-state drive (SSD); or may be a combination of the foregoing types of memories.

In the several embodiments provided in this application, it should be understood that the disclosed apparatuses and methods may be implemented in other manners. For example, the described apparatus embodiments are merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this patent application may be integrated into one processing unit, or each of the units may exist alone physically, or two or more units are integrated into one unit.

When functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the patent application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A duplication transmission method, comprising:
receiving, by a terminal device, through media access control (MAC) configuration signaling, duplication transmission configuration information from a radio access network (RAN) device, wherein the duplication transmission configuration information comprises configurations of a duplication transmission mode and a duplication transmission content of the terminal device, wherein the configuration of the duplication transmission mode instructs the terminal device whether to perform duplication transmission, wherein the configuration of the duplication transmission content indicates data radio bearer (DRB) data on which the terminal device performs duplication transmission, wherein the MAC configuration signaling comprises identifiers of at least two logical channels (LCs) and a duplication transmission indicator of each of the at least two LCs, wherein the at least two LCs correspond to the DRB, and wherein the duplication transmission configuration information is used to instruct the terminal device to activate or de-activate the duplication transmission for each logical channel; and performing, by the terminal device, duplication transmission based on the duplication transmission configuration information after a number retransmission for a DRB exceeds a first threshold quantity of retransmission times or a number of retransmission of a logical channel corresponding to the DRB exceeds a second threshold quantity of retransmission times.

2. The method according to claim 1, wherein the identifiers of the at least two LCs indicates indices of the at least two LCs.

3. The method according to claim 1, wherein the duplication transmission indicator takes value of 1 to indicate activation of a logical channel (LC) of the at least two LCs.

4. The method according to claim 1, wherein the duplication transmission indicator takes value of o to indicate activation of a logical channel (LC) of the at least two LCs.

5. The method according to claim 1, wherein a LC corresponds to one of the following: a cell, a carrier, a Numerology, or an antenna port.

6. A duplication transmission method, comprising:
sending, by a radio access network (RAN) device, through media access control (MAC) configuration signaling, duplication transmission configuration information to a terminal device, wherein the duplication transmission configuration information comprises configurations of a duplication transmission mode and a duplication transmission content of the terminal device, wherein the configuration of the duplication transmission mode instructs the terminal device whether to perform duplication transmission, wherein the configuration of the duplication transmission content indicates data radio bearer (DRB) data on which the terminal device performs duplication transmission, and wherein the MAC configuration signaling comprises identifiers of at least two logical channels (LCs) and a duplication transmission indicator of each of the at least two LCs, wherein the at least two LCs correspond to the DRB, and wherein the duplication transmission configuration information is used to instruct the terminal device to activate or de-activate the duplication transmission for each logical channel;
wherein the terminal device performs duplication transmission based on the duplication transmission configuration information after a number retransmission for a DRB exceeds a first threshold quantity of retransmission times or a number of retransmission of a logical channel corresponding to the DRB exceeds a second threshold quantity of retransmission times.

7. The method according to claim 6, wherein the identifiers of the at least two LCs indicates indices of the at least two LCs.

8. The method according to claim 6, wherein the duplication transmission indicator takes value of 1 to indicate activation of a logical channel (LC) of the at least two LCs.

9. The method according to claim 6, wherein the duplication transmission indicator takes value of o to indicate activation of a logical channel (LC) of the at least two LCs.

10. The method according to claim 6, wherein a LC corresponds to one of the following: a cell, a carrier, a Numerology, or an antenna port.

11. A terminal device, comprising:
a processor;
a transceiver coupled with the processor and configured to communicate with another network element; and
a non-transitory computer-readable storage medium coupled with the processor and storing a program including instructions which, when being executed by the processor, cause the processor to:
receive, through media access control (MAC) configuration signaling, duplication transmission configuration information from a radio access network (RAN) device, wherein the duplication transmission configuration information comprises configurations of a duplication transmission mode and a duplication transmission content of the terminal device, wherein the configuration of the duplication transmission mode instructs the terminal device whether to perform duplication transmission, wherein the configuration of the duplication transmission content indicates data radio bearer (DRB) data on which the terminal device performs duplication transmission, and wherein the MAC configuration signaling comprises identifiers of at least two logical channels (LCs) and a duplication transmission indicator of each of the at least two LCs, wherein the at least two LCs correspond to the DRB, and wherein the duplication transmission configuration information is used to instruct the terminal device to activate or de-activate the duplication transmission for each logical channel; and
perform, by the terminal device, duplication transmission based on the duplication transmission configuration information after a number retransmission for a DRB exceeds a first threshold quantity of retransmission times or a number of retransmission of a logical channel corresponding to the DRB exceeds a second threshold quantity of retransmission times.

12. The terminal device according to claim 11, wherein the identifiers of the at least two LCs indicates indices of the at least two LCs.

13. The terminal device according to claim 11, wherein the duplication transmission indicator takes value of 1 to indicate activation of a logical channel (LC) of the at least two LCs.

14. The terminal device according to claim 11, wherein the duplication transmission indicator takes value of o to indicate activation of a logical channel (LC) of the at least two LCs.

15. The terminal device according to claim 11, wherein a LC corresponds to one of the following: a cell, a carrier, a Numerology, or an antenna port.

16. A radio access network (RAN) device, comprising:
a processor;
a transceiver coupled with the processor and configured to communicate with another network element; and
a non-transitory computer-readable storage medium coupled with the processor and storing a program including instructions which, when being executed by the processor, cause the processor to:
send through media access control (MAC) configuration signaling, duplication transmission configuration information to a terminal device, wherein the duplication transmission configuration information comprises configurations of a duplication transmission mode and a duplication transmission content of the terminal device, wherein the configuration of the duplication transmission mode instructs the terminal device whether to perform duplication transmission, wherein the configuration of the duplication transmission content indicates data radio bearer (DRB) data on which the terminal device performs duplication transmission, and wherein the MAC configuration signaling comprises identifiers of at least two logical channels (LCs) and a duplication transmission indicator of each of the at least two LCs, wherein the at least two LCs correspond to the DRB, and wherein the duplication transmission configuration information is used to instruct the terminal device to activate or de-activate the duplication transmission for each logical channel;

wherein the terminal device performs duplication transmission based on the duplication transmission configuration information after a number retransmission for a DRB exceeds a first threshold quantity of retransmission times or a number of retransmission of a logical channel corresponding to the DRB exceeds a second threshold quantity of retransmission times.

17. The RAN device according to claim 16, wherein the identifiers of the at least two LCs indicates indices of the at least two LCs.

18. The RAN device according to claim 16, wherein the duplication transmission indicator takes value of 1 to indicate activation of a logical channel (LC) of the at least two LCs.

19. The RAN device according to claim 16, wherein the duplication transmission indicator takes value of o to indicate activation of a logical channel (LC) of the at least two LCs.

20. The RAN device according to claim 16, wherein a LC corresponds to one of the following: a cell, a carrier, a Numerology, or an antenna port.

* * * * *

UNITED STATES PATENT AND TRADEMARK OFFICE
CERTIFICATE OF CORRECTION

PATENT NO. : 11,664,931 B2
APPLICATION NO. : 16/657247
DATED : May 30, 2023
INVENTOR(S) : Han et al.

It is certified that error appears in the above-identified patent and that said Letters Patent is hereby corrected as shown below:

In the Claims

In Column 27, in Claim 4, Line 16, delete "of o to" and insert -- of 0 to --, therefor.

In Column 27, in Claim 9, Line 57, delete "of o to" and insert -- of 0 to --, therefor.

In Column 28, in Claim 14, Line 40, delete "of o to" and insert -- of 0 to --, therefor.

In Column 29, in Claim 19, Line 22, delete "of o to" and insert -- of 0 to --, therefor.

Signed and Sealed this
First Day of August, 2023

Katherine Kelly Vidal
*Director of the United States Patent and Trademark Office*